United States Patent [19]

Semonchik et al.

[11] 4,159,405
[45] Jun. 26, 1979

[54] PUSH BUTTON ARRANGED FOR MOUNTING TO A PANEL

[75] Inventors: William Semonchik, Normal; Arthur H. Unwin, Bloomington, both of Ill.

[73] Assignee: General Electric Company, New York, N.Y.

[21] Appl. No.: 800,372

[22] Filed: May 25, 1977

[51] Int. Cl.² .......................................... H01H 15/02
[52] U.S. Cl. ................................. 200/296; 200/340; 248/27.3
[58] Field of Search .......... 200/296, 295, 340, 159 A, 200/283; 248/27.1, 27.3

[56] References Cited

U.S. PATENT DOCUMENTS

| | | | |
|---|---|---|---|
| 1,400,155 | 12/1921 | Greenburg | 248/27.3 |
| 2,605,374 | 7/1952 | Batcheller | 200/295 |
| 3,501,599 | 3/1970 | Horecky | 200/295 |
| 3,522,403 | 8/1970 | Fuller | 200/340 |
| 3,965,320 | 6/1976 | Ditzig | 200/159 A |

Primary Examiner—Richard E. Aegerter
Assistant Examiner—Willis Little
Attorney, Agent, or Firm—W. C. Bernkopf

[57] ABSTRACT

An improved push button assembly including means for facilitating the mounting of the push button assembly to a mounting panel through an opening therein and from the front side thereof. The mounting means is comprised of first and second substantially flat resilient members. Each member has one end thereof fixed to respective opposite sides of the push button housing and another end thereof extending toward the front of the push button and biased away from the plane of the respective adjacent side of the housing. Each of the first and second members has a plurality of fingers forming the other end, wherein the plurality of fingers include a pair of end fingers and additional fingers intermediate the end fingers. The end fingers are bent to apply pressure to the rear of the mounting panel when the push button is fully inserted through the opening in the mounting panel, and the additional fingers are of varying length with respect to one another such that at least one of the additional fingers has its outermost edge abutting against the rear of the mounting panel when the push button is fully inserted through the opening in the mounting panel to lock the push button to the mounting panel, whereby the varying length of the additional fingers enables the push button to be mounted to mounting panels of varying thickness.

2 Claims, 7 Drawing Figures

PUSH BUTTON ARRANGED FOR MOUNTING TO A PANEL

BACKGROUND OF THE INVENTION

1. Field of the Invention

This invention relates to an improved push button, and, more particularly, to an improved push button assembly for facilitating the mounting of the push button to mounting panels of varying thickness.

2. Description of the Prior Art

In the past, and for the most part, push buttons have been mounted to horizontally positioned mounting panels. However, of late, particularly in the machine tool industry, push buttons are becoming increasingly used in an environment where they are mounted to vertically positioned mounting panels. One problem resulting from the mounting of a push button from a front side through an opening in a mounting panel is that it has required one person to be located on the front side of the mounting panel, and another person to be located to the rear side of the mounting panel to facilitate the locking of the push button to the mounting panel. Additionally, it has been found that when using various holding arrangements, due to the weight of wires which are attached to terminals which extend from a rear side of the push button, the push button tends to move freely within the opening in the mounting panel.

OBJECTS OF THE INVENTION

It is, therefore, an object of this invention to provide an improved push button which can be mounted to a mounting panel exclusively from one side of the mounting panel.

It is another object of the invention to provide an improved push button which can be firmly locked to a vertically positioned mounting panel when this push button is fixed to the mounting panel by an operator who is located at the front side thereof.

It is still a further object of the invention to provide an improved push button which is mounted to a vertically positioned mounting panel, which push button can be removed through the front side of the vertically positioned mounting panel by an operator who is located at the rear side of the mounting panel.

This and other objects of the invention will be pointed out hereinafter.

SUMMARY OF THE INVENTION

According to a broad aspect of the invention, there is provided an improved push button that is arranged for mounting to a panel. The push button is comprised of a housing having a front opening, rear, first, second, third and fourth sides and a flange portion adjacent the front opening. An actuating member extends through the front opening to within the housing. Switching means are also located within the housing and are mechanically coupled to the actuating member for changing the state of a switch as the actuating member is pushed in a direction into the housing. Means is provided for facilitating the mounting of the push button through an opening in the mounting panel and from the front side thereof. The mounting means is comprised of first and second substantially flat resilient members. Each member has one end thereof fixed to respective opposite sides of the push button housing and another end thereof extending toward the front opening of the push button housing and biased away from the plane of the respective adjacent side. Each of the first and second members has a plurality of fingers forming the other respective end. The plurality of fingers include a pair of end fingers and additional fingers positioned intermediate the end fingers. The end fingers are bent to apply pressure to the rear of the mounting panel when the push button is inserted through the opening in the mounting panel until the flange portion of the housing is abutting the front side of the mounting panel. The additional fingers are of varying length with respect to one another such that at least one of the additional fingers has its outermost edge abutting against the rear of the mounting panel when the push button is fully inserted through the opening of the mounting panel to lock the push button to the mounting panel. The distance between the flange portion of the housing and the outermost edge of the one additional finger is determinative of the varying thicknesses of the mounting panel that can be accommodated.

The additional fingers can be comprised of first, second and third fingers, wherein the first additional finger is centrally located between the pair of end fingers. The second additional finger is located between one of the end fingers and the first additional finger, and is longer than the first additional finger. The third additional finger is located between the other of the end fingers and the first finger, and is longer than the first and second additional fingers.

Each of the first and second members further includes means for facilitating removal of the push button by an operator located at the rear of the mounting panel by requiring the first and second members to be pressed toward their respective adjacent sides of the push button housing, whereby to then allow the push button to be pushed through the opening in the mounting panel and out the front side thereof. The removal means is comprised of the first and second members each having a V-shaped bend converging at the outer edge of the first additional finger of each member, wherein the diverging ends of each bend are confined within the outer perimeter of each of the respective first and second members for causing the outwardly extending fingers of each of the members to be biased in a direction away from the plane of the respective adjacent sides of the push button housing.

DESCRIPTION OF THE PREFERRED EMBODIMENT

Figure 1:
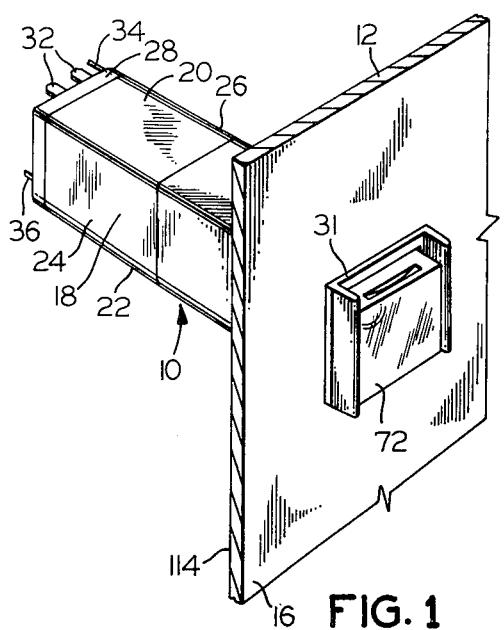
FIG. 1 is a perspective view of a push button already assembled to a vertically positioned mounting panel in accordance with the invention.
Figure 2:
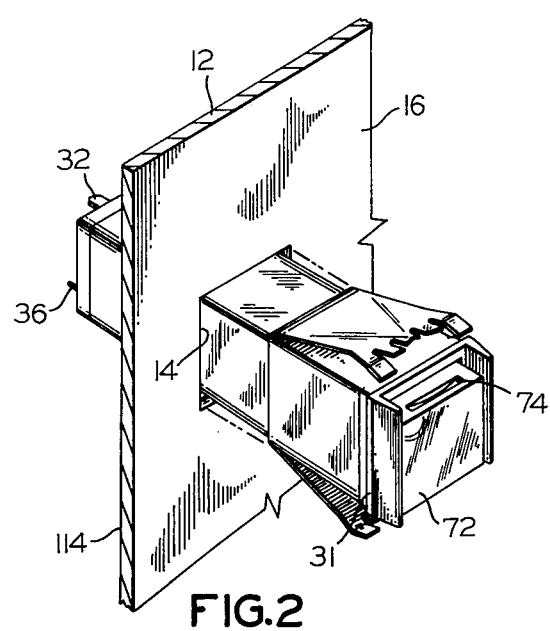
FIG. 2 is a perspective view of the same push button in the process of being mounted to a vertically positioned mounting panel.
Figure 3:
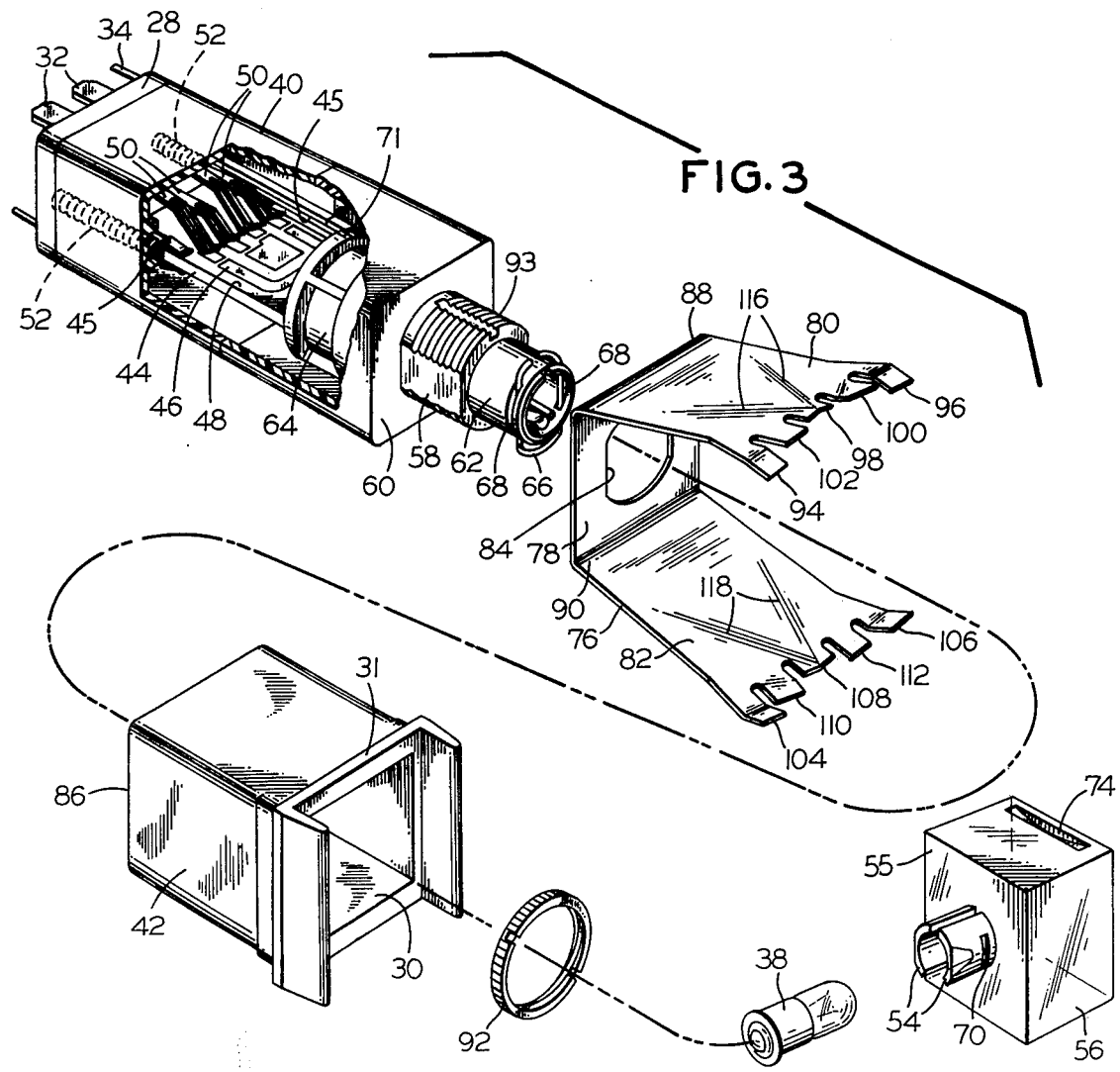
FIG. 3 is an enlarged, exploded perspective view of the push button shown in FIGS. 1 and 2 in accordance with the invention.

Referring now to FIGS. 1-7, the invention will now be described. In the preferred embodiment, as shown in FIGS. 1, 2 and 3, a push button 10 is shown mounted or in the process of being mounted to a vertically positioned panel 12 through an opening 14 in a front side 16 thereof. Although the internal mechanism of push button 10 can be a standard square oil tight illuminated push button such as a Model Serial No. CR104L or Model CR103LE01 made by the General Purpose Control Department of the General Electric Company, the following description is an example of such a mechanism.

As shown in FIG. 1, push button 10 is comprised of a housing 18 which has top and bottom surfaces 20 and 22 and left and right side surfaces 24 and 26, a rear surface 28 and, as shown in FIG. 3, a front opening 30, and a flange portion 31 located adjacent front opening 30 and extending outward from the top, bottom, right and left sides of housing 18. Extending from rear surface 28 of housing 18 are a plurality of switch terminals 32 (some of which are not shown) for making connection between, in this example, two normally open and two normally closed switches within the housing and external electrical circuitry (not shown). In addition thereto, there is also provided first and second electrical terminals 34 and 36 (shown in FIG. 1) also extending outward from rear surface 28 of housing 18 for making electrical connection between a power source (not shown) and the live terminals of a lamp 38, shown in FIG. 3.

As shown in FIG. 3, push button housing 18 is comprised of first and second sections 40 and 42, wherein the normally open and normally closed switches are located within section 40. The switches are comprised of a printed circuit board 44 which is horizontally slideably mounted within side interior wall slots 45 in housing section 40. Two standard normally open switches are provided by the combination of printed circuit board conductors 46 located on a top surface 48 thereof and four contact arms 50 which are electrically connected between the printed circuit conductors and external terminals 32. Similarly, two normally closed switches are formed via a printed circuit board arrangement extending from a bottom surface of printed circuit board 44 and four contact arms (all not shown). The above printed circuit board arrangement, which is thus comprised of two normally open and two normally closed switches, can be of standard layout and construction as provided by, for example, illuminated oil tight push button CR104L sold by the General Purpose Control Department of the General Electric Company. Printed circuit board 44 is normally biased via springs 52 away from rear surface 28 of the housing. Lamp 38 is held within flexible receptacle portions 54 extending from a main square shaped part 55 of a transparent or translucent lens housing 56. Housing section 40 has a partial threaded hollow cylindrical section 58 extending from a front end 60 thereof for receiving one section 62 of a hollow multi-sectioned cylindrical member 64. Section 62 provides a standard electrical socket for receiving and making electrical connection to lamp 38, while the lamp is held within lens housing 56. Lens housing 56 is fixed to section 62 by a spring member 66 located within slots 68 formed in section 62, which spring member engages another pair of slots 70 formed within flexible receptacle portions 54. Member 64 has a larger section 71 extending within housing section 40, wherein section 71 has a hollow contoured interior for engaging an end of printed circuit board 44. Thus the combination of lens housing 56 and member 64 forms a movable depressible, push button actuator for causing the normally open switches to close and the normally closed switches to open when a front end 72 of lens housing 56 is pushed in a direction inward through opening 14 in panel 12. Front end 72 of lens housing 56 has a top slot 74 and a bottom slot (not shown) for being gripped by the fingers of an operator to enable the operator to apply a sufficient pulling force to the lens housing to overcome the bias of spring member 66 to cause the lens housing to be removed through front opening 30 of housing section 42 of the push button.

Means for facilitating the mounting of push button 10 to mounting panel 12 through opening 14 in the mounting panel is provided by a unitary one-piece structure 76 having a base 78 and first and second substantially flat resilient members 80 and 82 extending from opposite edges of the base. Base 78 has a centrally located cutout 84 for enabling the base to be fixed between end surface 60 of section 40 and a similar end surface 86 of section 42. One end 88 of member 80 is thereby fixed to top surface 20 of housing 18, while another end of member 80 extends toward front opening 30 and is biased away from top surface 20, and one end 90 of member 82 is thereby fixed to bottom surface 22 of housing 18, while its other end extends toward front opening 30 of push button 10 and is biased away from bottom surface 22. The combination of sections 40 and 42 and unitary structure 76 are actually fastened together by screwing an internally threaded clamping ring 92 (shown in FIG. 3) onto a mating threaded section 93 of section 58 of housing section 40 after sections 40 and 42 and unitary structure 76 are assembled together.

The outwardly extending ends of resilient members 80 and 82, which are biased away from the respective adjacent top and bottom surfaces of housing 18, are formed by a plurality of fingers. The plurality of fingers associated with member 80 are comprised of a pair of end fingers 94 and 96, a first additional finger 98 centrally located between respective end fingers 94 and 96, a second additional finger 100 centrally located between fingers 96 and 98, and a third additional finger 102 located between fingers 94 and 98. Similarly, the plurality of fingers associated with resilient member 82 are comprised of first and second end fingers 104 and 106, a first additional finger 108 centrally located therebetween, a second additional finger 110 located between fingers 104 and 108, and a third additional finger 112 located between fingers 106 and 108. End fingers 94 and 96 and 104 and 106 are substantially identical, and extend out the same distance from base member 78. Similarly, respective first additional fingers 98 and 108 of respective members 80 and 82 are identical as are second additional fingers 100 and 110 and third additional fingers 102 and 112. It should be noted that end fingers 94 and 96 of member 80 are bent toward the plane of top surface 20, while end fingers 104 and 106 of member 82 are bent toward the plane of bottom surface 22 of housing 18. This is to ensure that the bent portion of the respective end fingers will serve to cause pressure to be applied in the direction of flange portion 31 from a rear surface 114 of mounting plate 12 when the push button is inserted through the opening in the mounting panel until flange portion 31 of the housing is abutting front side 16 of the mounting panel. It should be noted that first, second and third additional fingers 98, 100 and 102 are of varying length with respect to one another, while first, second and third additional fingers 108, 110 and 112 are of varying length with respect to one another. At least one of the first, second and third fingers of each of members 80 and 82 will have its outermost edge abutting against rear surface 114 of the mounting panel when the push button is fully inserted through the opening in the mounting panel to lock push button 10 to mounting panel 12.

In this example, respective first additional fingers 98 and 108 are the shortest and have their respective outermost edges extending farthest from flange 31. Similarly, respective second additional fingers 100 and 110 are longer than respective first additional fingers 98 and 108. Similarly, third additional fingers 102 and 112 of respective first and second members 80 and 82 are longer than the first and second additional fingers and have their respective outermost edges extending closest to flange 31. It should be noted that the outermost edges of the end fingers are generally virtually abutting flange 31 when the push button is finally positioned within the mounting panel.

Each of first and second resilient members 80 and 82 are further provided with means for facilitating removal of the push button by an operator located at the rear of the mounting panel by pressing members 80 and 82 toward the respective top and bottom surfaces of housing 18 so that the push button can be pushed through opening 14 and out the front side of mounting panel 12. The removal means is comprised of members 80 and 82 each having respective V-shaped bends 116 and 118 converging at the outer edge of respective first additional fingers 98 and 108, and having diverging ends confined within and prior to the outer periphery of each of respective first and second members 80 and 82. This causes the outwardly extending edges of fingers 98, 100 and 102 to be normally biased in a direction away from the plane of top surface 20 of housing 18, and the outwardly extending edges of fingers 108, 110 and 112 to be similarly normally biased away from the plane of bottom surface 22 of the housing.

Figure 4:
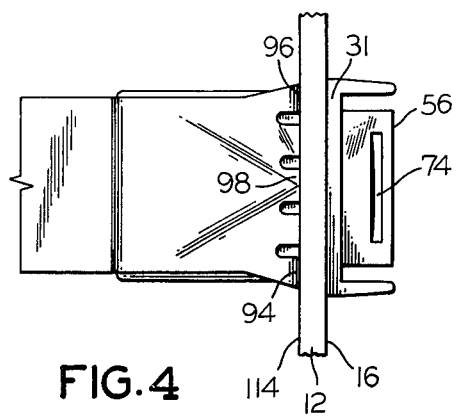
FIG. 4 is a top planar view showing a portion of the push button mounted to a mounting panel of the maximum thickness that can be accommodated in accordance with the invention.
Figure 5:
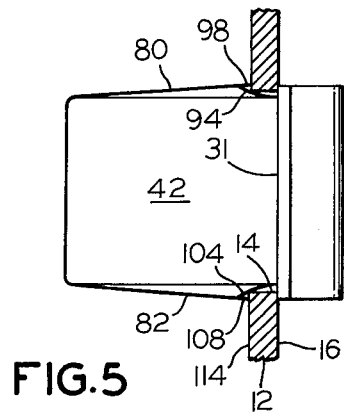
FIG. 5 is a partial side view of the embodiment shown in FIG. 4.

Referring to FIGS. 4 and 5, push button 10 is shown mounted to the thickest mounting panel that can be accommodated. This is accomplished by pushing the push button through opening 14 in mounting panel 12 from the front side thereof until flange 31 abuts front side 16 of the panel. When this happens, all the end fingers of members 80 and 82 are pressing the rear surface of the panel toward flange 31. The second and third fingers of each of resilient members 80 and 82 are still held down within hole 14 in the panel, while (the shortest) first fingers 98 and 108 have their outermost edges clear of opening 14 and abutting the rear surface of mounting panel 12, as shown in FIG. 5. As stated previously, the outermost edges of fingers 98 and 108 are abutting rear surface 114 of mounting panel 12, because they are biased away from their respective top and bottom surfaces of the housing due to the previously described V-shaped bends 116 and 118 in respective first and second members 80 and 82. The abutment of the outermost edges of centrally located first fingers 98 and 108 against rear surface 114 of mounting panel 12 causes the push button to be firmly locked to the mounting panel, and also prevents the push button from being removed by an operator who is located at the front of the mounting panel. The only way that the push button can be removed from the mounting panel is to have an operator, located at the rear of the mounting panel, squeeze first and second members 80 and 82 toward the respective top and bottom surfaces of the push button housing to overcome the bias imparted to the outermost edges of centrally located fingers 98 and 108 and enable these fingers to pass through opening 14 in the mounting panel in order that the push button can be pushed out through the front of the mounting panel from the rear thereof.

Figure 6:
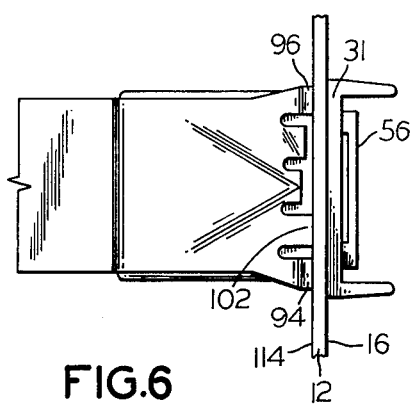
FIG. 6 is a top partial view of the push button mounted to a mounting panel having the minimum thickness that can be accommodated.

In the example shown in FIG. 6, the push button is shown securely mounted to the thinnest mounting panel that can be accommodated. In this instance, all three additional fingers of members 80 and 82 are clear of hole 14 in the mounting panel when the push button is mounted to the panel, wherein the longest (third additional) finger of each of members 80, 82 abuts the rear surface of the mounting panel to lock the push button to the mounting panel. Thus, the abutment of the outermost edge of one finger extending from member 80 and one finger extending from member 82 properly secures the push button to the mounting panel without allowing the push button to wiggle and squirm within the hole in the mounting panel.

Figure 7:
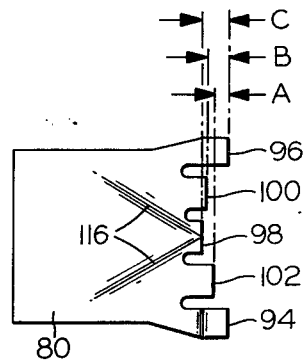
FIG. 7 is a top schematic view of one of the resilient members used for mounting the push button to mounting panels of varying thicknesses.

Referring to FIG. 7, which shows only first resilient member 80, it can be understood how mounting panels of at least three thicknesses can be accommodated, wherein the distance between the outermost edge of centrally located finger 98 and the outermost edges of fingers 94 and 96 establish dimension C, which dimension is the dimension of the thickest mounting panel that can be accommodated. Similarly, the distance between the outermost edge of the second longest finger 100 and the outermost edge of end fingers 94 and 96 establish the B dimension, which is the dimension of the intermediate mounting panel that can be accommodated. Finally, the distance between the outermost edge of the longest finger 102 and the outermost edge of end fingers 94 and 96 establish the A dimension, which is the dimension of the thinnest mounting panel that can be accommodated.

Although this invention has been described with reference to a specific embodiment thereof, numerous modifications are possible without departing from the invention, and it is desirable to cover all modifications falling within the spirit and scope of this invention.

What we claim as new and desire to secure by Letters Patent of the United States is:

1. A push button comprising:
   (a) a housing having a front opening, a rear, first, second, third and fourth sides, and a flange portion adjacent said front opening, said first and third sides being opposite one another;
   (b) an actuating member extending through said front opening to within said housing;
   (c) switch means, including at least one switch, within said housing and mechanically coupled to said actuating member for changing the state of said switch when said actuating member is pushed in a direction into said housing;
   (d) electrical terminals external of said housing and electrically coupled to said switch means; and
   (e) means for facilitating the mounting of said push button to a mounting panel through an opening in the mounting panel and from the front side thereof, said mounting means comprising first and second resilient members each having one end thereof fixed to said respective first and third sides of said housing and the other end thereof extending toward said front opening of said housing and biased away from said respective first and third sides, each of said first and second members having a plurality of fingers forming said other end, said plurality of fingers including a pair of end fingers and additional fingers positioned intermediate said pair of end fingers, said end fingers being bent to apply pressure to the rear of the mounting panel when said push button is inserted through the opening in the mounting panel until said flange portion of said housing is abutting the front side of the mounting panel, said additional fingers being of varying length with respect to one another such that at least one of said additional fingers has its outermost edge abutting against the rear of the mounting panel when said push button is fully inserted through the opening in the mounting panel to lock said push button to the mounting panel, whereby the distance between said flange portion of said housing and the outermost edge of said one additional finger is determinative of the thickness of the mounting panel that can be accommodated, said additional fingers of each of said first and second members including a first finger centrally located between said pair of end fingers, said first and second members each having a V-shaped bend converging at the center of said first finger of each member and having the diverging ends of said bend confined within the outer perimeter of each of said first and second members for causing the outwardly extending edges of said additional fingers of each of said members to be biased in a direction away from said respective first and third sides of said housing, whereby to facilitate removal by an operator of said push button from the rear of the mounting panel when the operator presses said first and second members towards said respective first and third sides of said housing and then pushes said push button through the opening in the mounting panel and out the front side thereof.

2. A push button according to claim 1. wherein said additional fingers are further comprised of second and third fingers, said second finger being located between one of said end fingers and said first finger and longer than said first finger, and said third finger being located between the other of said end fingers and said first finger and longer than said first and second fingers.

* * * * *